United States Patent
Akhtar et al.

(10) Patent No.: US 10,455,261 B2
(45) Date of Patent: Oct. 22, 2019

(54) SIGNALING SCHEME FOR IMPROVED VIDEO STREAMING

(71) Applicant: Nokia Solutions and Networks OY, Espoo (FI)

(72) Inventors: Shahid Akhtar, Richardson, TX (US); Kamakshi Sridhar, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 59 days.

(21) Appl. No.: 15/677,116

(22) Filed: Aug. 15, 2017

(65) Prior Publication Data

US 2019/0058901 A1    Feb. 21, 2019

(51) Int. Cl.
| | |
|---|---|
| *H04N 21/2385* | (2011.01) |
| *H04N 21/2662* | (2011.01) |
| *H04L 29/06* | (2006.01) |
| *H04N 21/234* | (2011.01) |
| *H04N 21/235* | (2011.01) |

(Continued)

(52) U.S. Cl.
CPC ....... *H04N 21/2385* (2013.01); *H04L 65/605* (2013.01); *H04L 65/607* (2013.01); *H04L 65/80* (2013.01); *H04N 21/235* (2013.01); *H04N 21/23418* (2013.01); *H04N 21/2662* (2013.01); *H04N 21/64738* (2013.01); *H04N 21/64784* (2013.01); *H04W 80/06* (2013.01)

(58) Field of Classification Search
None
See application file for complete search history.

(56) References Cited

U.S. PATENT DOCUMENTS

| | | |
|---|---|---|
| 2013/0031575 A1 | 1/2013 | Gallant et al. |
| 2013/0286868 A1 | 10/2013 | Oyman et al. |

(Continued)

FOREIGN PATENT DOCUMENTS

WO    WO2014/058431 A1    4/2014

OTHER PUBLICATIONS

Sainju, P. M., "LTE Performance Analysis on 800 and 1800 MHz Bands," Master of Science Thesis, Tempere University of Technology, May 7, 2012, pp. 96.

(Continued)

*Primary Examiner* — Omar S Parra
(74) *Attorney, Agent, or Firm* — Mendelsohn Dunleavy, P.C.; Steve Mendelsohn (57) ABSTRACT

In one embodiment, a mobile communications system has a plurality of radio access network (RAN) nodes communicating wirelessly with a plurality of wireless user devices, a video server transmitting one or more packetized video streams to one or more of the wireless user devices, and a packet core routing packets of video data from the video server to the one or more wireless user devices via the RAN nodes. For each packetized video stream, the video server transmits in-band information related to the packetized video stream, such as relative screen size, relative video activity level, and minimum and maximum video quality levels, and each RAN node extracts and uses the in-band information to schedule transmission of the packets of video data to its one or more corresponding wireless user devices. The system can provide higher-quality video experience without wasting bandwidth on user devices that don't require much communication resources.

18 Claims, 2 Drawing Sheets

| TYPE | LENGTH |
|---|---|
| ExID ||
| FRAG/FLAGS | RSS/RVA |
| MinVQ ||
| MaxVQ ||
| AUTH MAC (20 BYTES) ||

(51) Int. Cl.
*H04N 21/647* (2011.01)
*H04W 80/06* (2009.01)

(56) References Cited

U.S. PATENT DOCUMENTS

| | | |
|---|---|---|
| 2015/0163147 A1 | 6/2015 | Li et al. |
| 2015/0296047 A1 | 10/2015 | Ghazisaidi |
| 2017/0070551 A1 | 3/2017 | Phillips et al. |
| 2017/0070757 A1 | 3/2017 | Phillips et al. |
| 2017/0070758 A1 | 3/2017 | Phillips et al. |
| 2017/0070773 A1 | 3/2017 | Phillips et al. |
| 2018/0083886 A1* | 3/2018 | Peitzer ............... H04L 47/76 |

OTHER PUBLICATIONS

J. C. Ikuno, M. Wrulich and M. Rupp, "System Level Simulation of LTE Networks," 2010 IEEE 71st Vehicular Technology Conference, Taipei, 2010, pp. 1-5.

Ni, Mingjian, et al. "A Channel Feedback Model with Robust SINR Prediction for LTE Systems." 2013 7th European Conference on Antennas and Propagation, EuCAP 2013, 2013, pp. 1866-1870.

Kumar, Swarun E, et al. "LTE Radio Analytics Made Easy and Accessible." Computer Communication Review, vol. 44, No. 4, 2015, pp. 211-222.

Cicalo, Sergio, et al. "Improving QoE and Fairness in HTTP Adaptive Streaming Over LTE Network." IEEE Transactions on Circuits and Systems for Video Technology, vol. 26, No. 12, 2016, pp. 2284-2298.

Rayal, F., "LTE Peak Capacity Explained: Flow to Calculate it?" Strategic Insights & Advisory in Telecom and Technology, May 5, 2017, pp. 1-12.

Sauter, M., "LTE and The Number of Simultaneously Connected Users," as retrieved on May 5, 2017 from https://bog.wirelessmoves.com/2016/02/lte-and-the-number-of-simultaneously-connected-users.html, pp. 1-3.

"LTE Resource Guide," Anritsu Company, 2009, as retrieved from http://web.cecs.pdx.edu/~fli/class/LTE_Reource_Guide.pdf, 18 pages.

Bethanabhotla, Dilip, Giuseppe Caire, and Michael J. Neely. "Adaptive video streaming for wireless networks with multiple users and helpers." IEEE Transactions on Communications 63.1. 2015, pp. 268-285.

Kumar, Satish, et al. "Buffer Aware Three Level Scheduler for Video Streaming over LTE" 2017 9th International Conference on Communication Systems and Networks (COMSNETS), pp. 222-228.

Miller, Konstantin, et al. "A control-theoretic approach to adaptive video streaming in dense wireless networks." IEEE Transactions on Multimedia 17.8, 2015, pp. 1309-1322.

Psannis, Kostas E. "Adaptive layered Segment Algorithm for media delivery over 4G LTE wireless cellular networks." In Broadband Multimedia Systems and Broadcasting (BMSB), 2013 IEEE International Symposium on, pp. 1-5.

Singh, S., et al., "Video capacity and QoE enhancements over LTE." In Communications (ICC), 2012 IEEE International Conference on, pp. 7071-7076.

Singh, S., et al., "Video capacity and QoE enhancements over LTE." 2012 IEEE International Conference, presentation slides, pp. 1-20.

Sousa, I., et al., "A Survey on QoE-oriented Wireless Resources Scheduling." arXiv preprint arXiv:1705.07839, May 2017, pp. 1-16.

Wirth, T., et al., "Advanced downlink LTE radio resource management for HTTP-streaming." In Proceedings of the 20th ACM international conference on Multimedia, 2012, pp. 1037-1040.

Zahran, A. H., et al., "Impact of the LTE scheduler on achieving good QoE for DASH video streaming." In Local and Metropolitan Area Networks (LANMAN), 2016 IEEE International Symposium on, pp. 1-7.

Zahran, A. H., et al., "Impact of the LTE scheduler on achieving good QoE for DASH video streaming." 2016 IEEE International Symposium, pp. 1-49.

Capozzi, Francesco, et al. "Downlink packet scheduling in LTE cellular networks: Key design issues and a survey." IEEE Communications Surveys & Tutorials 15.2 (2013): 52 pages.

Cardwell, N., et al. "Congestion-Based Congestion Control," Network, Sep.-Oct. 2016, pp. 20-53.

He, L., et al. "Playback continuity driven cross-layer design for HTTP streaming in LTE systems." World of Wireless, Mobile and Multimedia Networks (WoWMoM), 2014 IEEE 15th International Symposium on a. IEEE, 2014.

Jain, A., et al. "Mobile Throughput Guidance Inband Signaling Protocol." IETF, work in progress (2015), pp. 1-16.

Kwan, R., et al. "A survey of scheduling and interference mitigation in LTE" Journal of Electrical and Computer Engineering 2010 (2010): 1, 10 pages.

Ramli, Huda Adibah Mohd, et al. "Performance of well known packet scheduling algorithms in the downlink 3GPP LTE system." Communications (MICC), 2009 IEEE 9th Malaysia International Conference on. IEEE, 2009.

Robinson, D., et al. "Subjective video quality assessment of HTTP adaptive streaming technologies." Bell Labs Technical Journal 16.4 (2012): 5-24.

Seufert, Michael, et al. "A survey on quality of experience of HTTP adaptive streaming." IEEE Communications Surveys & Tutorials 17.1 (2015): 469-492.

Tan, Peng Hui, et al. "Joint rate control and scheduling for video streaming over OFDMA networks." Communication Systems (ICCS), 2014 IEEE International Conference on. IEEE, 2014.

Tao, L., et al. "Energy efficient video QoE optimization for dynamic adaptive HTTP streaming over wireless networks." Communication Systems (ICCS), 2016 IEEE International Conference on. IEEE, 2016.

Touch, Joseph. "Shared Use of Experimental TCP Options." Internet Engineering Task Force (IETF), 2013, pp. 1-11.

Turaga, D., et al. "Hierarchical modeling of variable bit rate video sources." Packet Video, vol. 2001, 2001, 10 pages.

Jon, Postel. Transmission control protocol—darpa internet program protocol specification. RFC-793, DARPA, 1981, pp. Title-85.

Viswanathan, H., et al. "Mobile video optimization at the base station: Adaptive guaranteed bit rate for HTTP adaptive streaming." Bell Labs Technical Journal 18.2 (2013): 159-174.

De Vleeschauwer, D., et al. "Optimization of HTTP adaptive streaming over mobile cellular networks." INFOCOM, 2013 Proceedings, IEEE, 2013, pp. 989-997.

Zhao, Miao, et al. "Utility-maximization framework for dynamic adaptive streaming over HTTP in multi-user MIMO LTE networks." Sensing, Communication, and Networking (SECON), 2014 Eleventh Annual IEEE International Conference on. IEEE, 2014, pp. 28-36.

* cited by examiner

SIGNALING SCHEME FOR IMPROVED VIDEO STREAMING

BACKGROUND

Field of the Invention

The present invention relates to the transmission of video streams in mobile communications systems.

Description of the Related Art

This section introduces aspects that may help facilitate a better understanding of the invention. Accordingly, the statements of this section are to be read in this light and are not to be understood as admissions about what is prior art or what is not prior art.

In a typical mobile communications system that supports video streaming, video data is transmitted from a video server (e.g., a content delivery network (CDN)) to mobile user equipment (UE) devices via a radio access network (RAN). For example, in a system that conforms to the Transmission Control Protocol (TCP), packetized video streams are transmitted as TCP flows from the video server to the UE devices using HTTP (Hypertext Transport Protocol) Adaptive Streaming (HAS). In adaptive video streaming, the amount of data to be transmitted for a given Quality of Experience (QoE) level can vary over time as the video content varies. Moreover, the amount of data for a given QoE level can also differ for different UE devices having screens of different size (i.e., different numbers of pixels). Furthermore, the amount of bandwidth allocated by the RAN for a particular UE device will depend on the number of different UE devices and the individual demands of those devices concurrently competing for shares of the same bandwidth. Varying transmission channel conditions can also impact the ability of maintaining a satisfactory QoE level for each device. Poor video QoE typically involves frequent rebuffering events, abrupt changes in video quality (VQ) levels, long startup times, and/or picture freezing due to buffer exhaustion when the video client on the UE device is not able to play even at the lowest VQ level. The challenge of providing high video QoE to one user is balanced by the need of the network to provide adequate resources to other users in a fair manner.

At any given time, the RAN may be concurrently handling the flows of multiple adaptive streams of video to different UE devices. Unfortunately, in some conventional mobile video systems, the RAN does not have all of the information that it would otherwise need to effectively handle such flows of adaptive streaming video. In particular, the RAN does not know certain details of the video streams such as minimum VQ (video quality) or maximum VQ levels. The RAN can try to infer this information in real time by executing appropriate machine learning algorithms, but such algorithms can introduce significant amounts of error and be computationally expensive. In addition, the RAN is unaware of the device screen size and the nature of video being delivered by the video server. As a result, the RAN has no way of knowing if the allocated bit rates are appropriate for the various video streams and for the user devices on which those video streams are played. As a result, the possibility exists that a given user device will be allocated (i) too little bandwidth, thereby resulting in poor QoE, or (ii) too much bandwidth, thereby resulting in wasted bandwidth.

SUMMARY

Problems in the prior art are addressed in accordance with the principles of the present invention by a technique whereby a radio access network can gain additional information, such as device screen size and the nature of the video content as well as the minimum and maximum video quality levels, for each user device supported by the RAN in order for the RAN to allocate a suitable amount of communication resources (e.g., number of time slots) to attempt to maintain high video QoE for all user devices.

In some embodiments, the present invention is a mobile communications system comprises a plurality of radio access network (RAN) nodes, a video server, and a packet core. Each RAN node is configured to communicate wirelessly with a plurality of wireless user devices, the video server is configured to transmit one or more packetized video streams to one or more of the wireless user devices, and the packet core is configured to route packets of video data from the video server to the one or more wireless user devices via the RAN nodes. The video server is configured to transmit, in each packetized video stream, in-band information related to the packetized video stream, and each RAN node is configured to use the in-band information to schedule transmission of the packets of video data to the one or more wireless user devices.

In some embodiments of the above, the packets of video data are Transmission Control Protocol (TCP) packets, and the in-band information is transmitted in TCP Options fields in the TCP packets.

In some embodiments of one or more of the above, in-band information is transmitted at the start of a video chuck of each packetized video stream.

In some embodiments of one or more of the above, when a wireless user device receiving a packetized video stream moves from a first RAN node to a second RAN node, such that subsequent packets of video data for the packetized video stream get routed to the wireless user device via the second RAN node instead of the first RAN node, the video server includes the in-band information in one or more of the subsequent packets of video data and the second RAN node uses the in-band information to schedule transmission of the subsequent packets of video data to the wireless user device.

In some embodiments of one or more of the above, for each packetized video stream, the in-band information comprises a minimum video quality (VQ) level value, a maximum VQ level value, a relative screen size value, and a relative video activity value.

In some embodiments of one or more of the above, for each packetized video stream, the video server is configured to determine the minimum and maximum VQ level values from a video manifest received from a corresponding wireless user device, the video server is configured to determine the relative screen size value from a user agent field in an HTTP request received by the video server from the corresponding wireless user device, and the video server is configured to determine the relative video activity value by analyzing content of the packetized video stream.

In some embodiments of one or more of the above, the video server is configured to (i) determine the relative video activity value by analyzing the content of the packetized video stream off line and (ii) store the relative video activity value for subsequent transmission with the packetized video stream.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
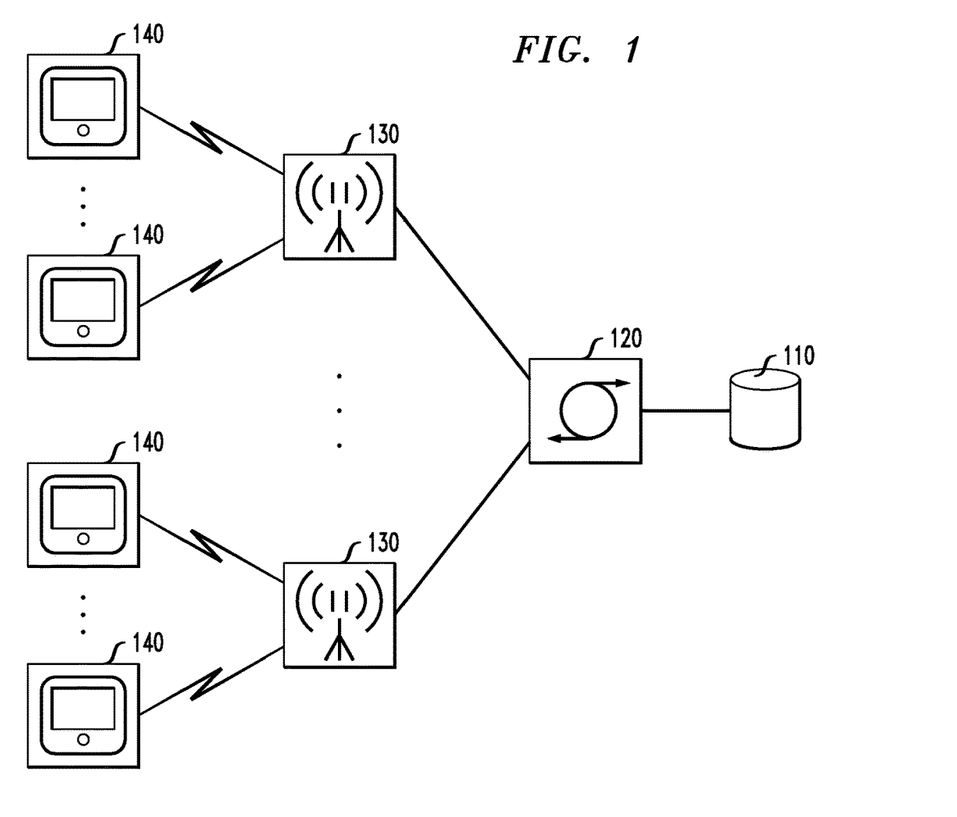
FIG. 1 is a simplified, high-level block diagram of a communications system according to one embodiment of the invention.

FIG. 1 is a simplified, high-level block diagram of a communications (comm) system 100 according to one embodiment of the invention. As shown in FIG. 1, comm system 100 includes a video server 110 (such as a content delivery network (CDN)), a packet core 120 (such as an Evolved Packet Core (EPC)), a plurality of radio access network (RAN) nodes 130 (such as eNodeBs), and a plurality of wireless user devices 140, where each RAN node 130 concurrently handles wireless communications with one or more of the wireless user devices 140, some or all of which may be mobile devices, such as, for example, cell phones, tablets, or laptop computers.

The video server 110 is capable of transmitting a different packetized video stream to each user device 140 via the packet core 120 and the corresponding RAN node 130. Note that a mobile user device 140 may move from being handled by one RAN node 130 to being handled by another RAN node 130. The packet core 120 keeps track of which RAN nodes 130 are currently handling which user devices 140. If a packetized video stream is being transmitted from the video server 110 to a particular mobile user device 140 via a first RAN node 130, then the packet core 120 keeps track of the mobile device 140 moving from being handled by the first RAN node 130 to being handled by a different, second RAN node 130, such that the packet core 120 will route subsequent packets of video data for that packetized video stream to that mobile device 140 via the second RAN node 130.

Each RAN node 130 performs scheduling to allocate its transmission resources (e.g., time slots in time-division multiplexing (TDM) communications) to its current set of wireless user devices 140 with a goal of fairly distributing those resources in a way that satisfies the requirements of each user device. According to one embodiment of the invention, for its user devices 140 that are currently running video clients, a RAN node 130 performs scheduling based on the following information transmitted in-band by the video server to the RAN node for each packetized video stream currently being handled by the RAN node:

MinVQ—minimum video quality level value (e.g., expressed in terms of bit rate);
MaxVQ—maximum video quality level value (e.g., expressed in terms of bit rate);
RSS—relative screen size value for the user device (e.g., a dimensionless value); and
RVA—relative video activity value for the packetized video stream (e.g., a dimensionless value).

In one implementation, a video server transmits a manifest file to the video client when the user device requests receipt of a particular packetized video stream, where the manifest file includes information regarding the MinVQ and MaxVQ values for that video stream. The video server 110 extracts that information and transmits the corresponding MinVQ and MaxVQ values as part of the in-band information transmitted to the corresponding RAN node 130 for that user device.

Furthermore, for chunked video streams, the video client at the user device 140 transmits to the video server 110 an HTTP request for receipt of each chunk of packetized video data in the corresponding video stream. In one implementation, the video server 110 executes a specially designed algorithm to derive information about the size of the screen (i.e., monitor or display) at the user device 140 from the agent field of an HTTP request received from the video client and uses that derived information to generate the corresponding RSS value to be transmitted in-band to the corresponding RAN node 130 for that video stream. Software that may be used to derive the screen size information is the DeviceAtlas™ software available from Afilias plc of Dublin, Ireland. Another example is the open-source Browscap software available from Github Inc. of San Francisco, Calif.

Lastly, the video server 110 (or another node in the communications system 100) executes a specially designed, video activity, machine learning algorithm to derive information about the activity level of the corresponding video stream and uses that information to generate the corresponding RVA value to be transmitted in-band to the corresponding RAN node 130 for that video stream. Deepak S. Turaga and Tsuhan Chen, "Hierarchical modeling of variable bit rate video sources," Packet Video, Vol. 2001, the teachings of which are incorporated herein by reference, describes technology that may be used to derive suitable video activity information. Depending on the particular implementation, a given video stream may have a single, static RVA value or the RVA value may change over time as the video activity level of the video content changes over time.

Since the processing involved in deriving video activity information is computationally intense, in certain implementations, that software is executed off line, and the resulting one or more RVA values are stored along with the video stream for real-time access when the video steam is transmitted from the video server 110 to a user device 140.

In certain embodiments, the communications system 100 conforms to the Transport Control Protocol (TCP), and each packet of video data is a TCP data packet. In certain implementations, the video server 110 uses available TCP Options fields to transmit the in-band information for each packetized video stream, and each RAN node 130 snoops its received packets to extract the in-band information for each video stream that the RAN node is currently handling. In certain implementations, the video server 110 re-transmits the in-band information at the start of each chunk of video data. When a RAN node 130 receives its first chunk of video data for a given video stream, the RAN node will extract and use the in-band information to schedule the packets for that video stream. Depending on the particular implementation, the RAN node 130 will repeat, at appropriate times, the extraction of in-band information and the scheduling of communications based on the extracted in-band information.

Note that, in some implementations, each RAN node 130 transmits a TCP acknowledgement message back to the video server 110 for each received set of in-band information so that the video server 110 will know that the in-band information was safely received. Note further that no corresponding in-band signaling is required to the user devices 140.

Upon receiving this information, the RAN can take the screen size and video activity level into consideration when allocating wireless resources to the video such that enough bandwidth is allocated to avoid going below the minimum VQ level and without allocating too much bandwidth based on the maximum VQ level. For example, if video is being delivered to a user device having a small screen size, then the RAN can set the target bit rate for that video to a lower level in order to achieve high clarity on the small screen size compared to another video flow being delivered to a user device having a larger screen size that would require a higher target bit rate for high clarity. Likewise, the RAN can set the target bit rate to a lower rate for a video that has a relatively low activity level (e.g., a video of a roundtable conversation as compared to a streaming video of a sports event).

Figure 2:
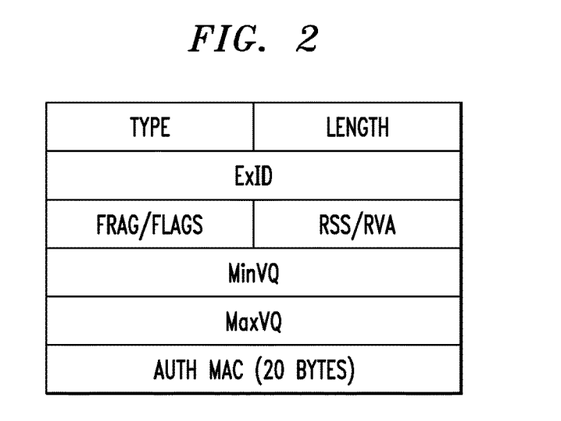
FIG. 2 is a representation of one possible format of the in-band information transmitted by the video server of FIG. 1 in the TCP Options fields of a conventional TCP data packet.

FIG. 2 is a representation of one possible format of the in-band information transmitted by the video server 110 in the TCP Options fields of a conventional TCP data packet. The eight-bit fields Type, Length, and Frag/Flags and the 16-bit ExID field are standard TCP fields, where ExID is an experimental ID assigned by the Internet Assigned Numbers Authority (IANA), and Frag/Flags is used when the in-band information is transmitted over multiple TCP data packets. The 20-byte Auth MAC field is a conventional message authentication code used to authenticate the in-band information.

The eight-bit RSS/RVA field and the 16-bit MinVQ and MaxVQ fields represent the in-band information according to certain embodiments of the invention. In one possible implementation, the eight-bit RSS/RVA field would support 16 different RSS values and 16 different RVA values if the eight bits were allocated as four bits for the RSS value and four bits for the RVA value. In one implementation, each of the 16-bit MinVQ and MaxVQ fields is defined with 12 integer bits and four fractional bits in integer increments of 1 Mbps to support a maximum value of 4 Gbps and a resolution of 64 Kbps.

In one possible implementation, the available RSS values are 1-4, where 1 represents the smallest relative screen size (i.e., relatively small number of pixels) and 4 represents the largest relative screen size (i.e., relatively large number of pixels), where a larger number of pixels (typically) implies that a larger transmission bit rate will be required.

Similarly, the available RVA values may also be 1-4, where 1 represents the lowest relative video activity (e.g., relatively static video content) and 4 represents the highest relative video activity (e.g., relatively dynamic video content), where a higher video activity (typically) implies that a larger transmission bit rate will be required. Note that other implementations can use a greater (or smaller) number of different RSS and/or RVA values to represent these characteristics with more (or less) resolution and/or greater (or lesser) range.

Figure 3:
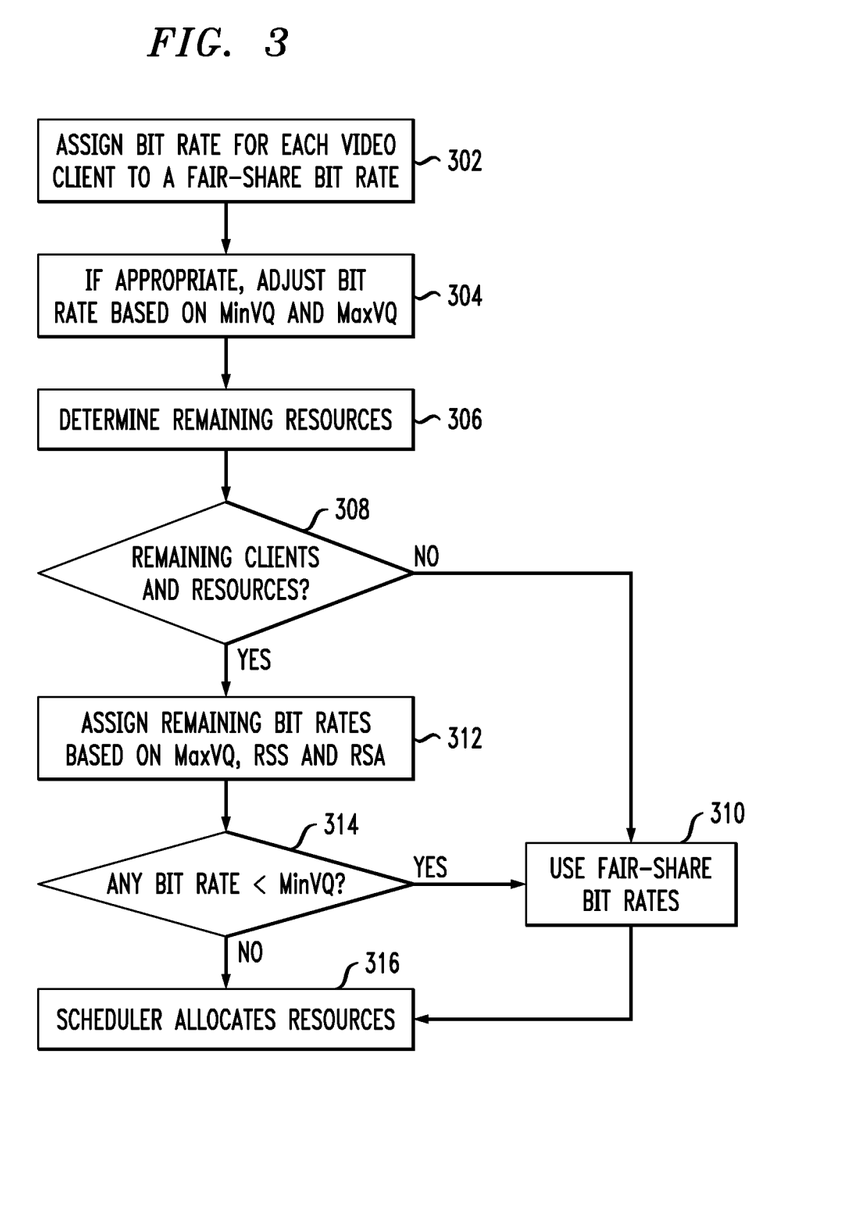
FIG. 3 is a flow diagram of one example implementation of the scheduling algorithm implemented at each RAN node of FIG. 1 for the one or more video clients running on user devices that the RAN node is currently handling.

FIG. 3 is a flow diagram of one example implementation of the scheduling algorithm implemented at each RAN node 130 for the one or more video clients running on user devices 140 that the RAN node is currently handling. Other implementations are also possible. Note that the processing of FIG. 3 is implemented whenever a new video client is added to the RAN node's list of current user devices (either because an existing user device has just launched a video client or because a user device with an ongoing video client has just moved into the RAN node's coverage area). For efficient allocation of communication resources, the processing of FIG. 3 should also be implemented whenever a video client is removed from the RAN node's list of current user devices. Beyond that, if the RVA values for one or more of the video streams are dynamic, then the processing of FIG. 3 may be repeated more frequently (e.g., every time a new chunk of video data is received for any of those existing video streams or every time the RAN node detects a change in an RVA value for one of its existing video streams).

Note further that, in addition to its video clients, a RAN node 130 may have one or more non-video clients operating at its user devices 140 that are also allocated communication resources. The algorithm of FIG. 3 addresses the allocation of resources for only video clients. Other processing implemented by the RAN node would handle the allocation of resources to any non-video clients.

Referring to FIG. 3, in step 302, for each video client i, the RAN node 130 assigns a bit rate BRBi based on a fair-share bit rate FSBRi determined by the RAN node implementing a suitable fair-share scheduling algorithm based on the total communication resources available to the RAN node's current set of video clients. In one possible implementation, a fair share is a straight proportion of the total available bandwidth Rvt based on the total number of video clients. For example, if there were five video clients, then each video client's fair-share bit rate FSBR would be 20% of the total available bit rate for all video clients. Those skilled in the art will understand that there many other conventional fair-share scheduling algorithms that can be used to generate the fair-share bit rates FSBR.

In step 304, for each video client i, if appropriate, the RAN node adjusts the assigned bit rate BRBi based on the minimum VQ value MinVQi or the maximum VQ value MaxVQi for that video client. In particular, if (FSBRi<MinVQi) and if (MinVQi<FSBRi*(1+Maximum_Unfairness)), then the assigned bit rate BRBi is set equal to MinVQi, where Maximum_Unfairness is a value (greater than 0) that indicates how much unfairness will be allowed in the allocation of resources to any video client. In other words, if (1) the fair-share bit rate FSBRi for the ith video client is less than its minimum video quality level MinVQi and if (2) it would not be unfair to assign the minimum video quality level MinVQi to the ith video client, then the ith video client is assigned its minimum video quality level MinVQi. If either of the two conditions are not met, then the assigned bit rate BRBi for that video client remains at its fair-share bit rate FSBRi.

For example, assume that the fair-share bit rate FSBRi for the ith video client is 1.0 Mbps, and the minimum video quality level MinVQi for that video client is 1.6 Mbps. In that case, the first condition (FSBRi<MinVQi) would be satisfied. If the maximum unfairness parameter were set at 50%, then the second condition (MinVQi<FSBRi*(1+Maximum_Unfairness)) would not be satisfied (because 1.6 Mbps is not less than 1.5 Mpbs), and the assigned bit rate BRBi would remain at the fair-share bit rate FSBRi of 1.0 Mpbs. If, however, the maximum unfairness parameter were set at 70%, then the second condition (MinVQi<FSBRi*(1+Maximum_Unfairness)) would be satisfied (because 1.6 Mbps is less than 1.7 Mpbs), and the assigned bit rate BRBi would be set to the minimum video quality level MinVQi of 1.6 Mbps.

On the other hand, if (FSBRi>MaxVQi*Minimum_Headroom), then the assigned bit rate BRBi for the ith video client is set equal to (MaxVQi*Minimum_Headroom), where Minimum_Headroom is a value (between 0 and 1) that indicates the minimum amount of headroom that can be allocated to any video client. In other words, if the fair-share bit rate FSBRi is greater than the maximum allowable bit rate taking into account the minimum headroom requirement, then the assigned bit rate BRBi is set to that maximum allowable bit rate.

Assume, for example, that the fair-share bit rate FSBRi for the ith video client is 1.5 Mbps, and the maximum video quality level MaxVQi for that video client is 2.0 Mbps. If the minimum headroom parameter were set at 80%, then the condition (FSBRi>MaxVQi*Minimum_Headroom) would not be satisfied (because 1.5 Mbps is not greater than 1.6 Mbps), and the assigned bit rate BRBi would remain at the fair-share bit rate FSBRi of 1.5 Mbps. If, however, the minimum headroom parameter were set at 70%, then the condition (FSBRi>MaxVQi*Minimum_Headroom) would be satisfied (because 1.5 Mbps is greater than 1.4 Mbps), and the assigned bit rate BRBi would be set to (MaxVQi*Minimum_Headroom) of 1.4 Mbps.

In step 306, the RAN node 130 determines the amount of remaining bandwidth (Ric) according to Equation (1) as follows:

$$Ric = Rvt - \Sigma BRBi, \quad (1)$$

where Rvt is the total available bandwidth for video clients, and ΣBRBi is the total bandwidth assigned to video clients in step 304. The remaining bandwidth Ric is the bandwidth that is available to be assigned to the video clients whose bit rates BRB were not adjusted in step 304.

In step 308, the RAN node 130 determines whether or not there are any remaining video clients whose assigned bit rates BRB were not adjusted in step 304 and, if so, whether there is any remaining bandwidth to be allocated to those remaining video clients (i.e., whether (Ric>0)). Although not explicitly shown in FIG. 3, if there are no remaining video clients (i.e., all of the video clients had their assigned bit rates BRB adjusted in step 304), then processing would proceed to step 316, where the RAN node's scheduler tries to allocate resources (e.g., time slots) to the video clients according to their requested bit rates BRB. If there are remaining video clients, but there is no remaining bandwidth for those remaining video clients, then processing proceeds to step 310, where the RAN node 130 re-assigns the original fair-share bit rates FSBR to all of the video clients. Processing then proceeds to step 316.

If there are remaining video clients and there is remaining bandwidth for those remaining video clients, then processing proceeds to step 312. In step 312, the RAN node 130 assigns bit rates to the remaining video clients based on the remaining bandwidth and the corresponding MaxVQ, RSS, and RSA values for those video clients. In particular, the RAN node 130 determines the assigned bit rate BRBi for the ith remaining video client according to Equation (2) as follows:

$$BRBi = Ric * RTICi, \quad (2)$$

where RTICi is the fraction of the remaining bandwidth Ric to be allocated to the ith remaining video client, where RTICi is determined by the RAN node 130 according to Equation (3) as follows:

$$RTICi = \frac{RBRi}{\Sigma RBRi}, \quad (3)$$

where RBRi is the relative bit rate of the ith remaining video client, where RBRi is determined by the RAN node 130 according to Equation (4) as follows:

$$RBRi = \frac{MaxVQi * RSSi * RVAi}{16}, \quad (4)$$

where MaxVQi is the maximum video quality level for the ith remaining video client, RSSi is the relative screen size value for the ith remaining video client, and RVAi is the relative video activity value for the ith remaining video client, where RSSi and RVAi can each be 1, 2, 3, or 4. According to Equations (3) and (4), each remaining video client's share of the remaining bandwidth is scaled based on its RSS and RVA values.

In step 314, if the RAN node 130 determines that the assigned bit rate BRBi is smaller than the minimum video quality value MinVQi for any video client i, then processing proceeds to step 310 and then to step 316. Otherwise, processing proceeds to step 316, where the RAN node's scheduler allocates resources to the video clients based on the bit rates BRB assigned in steps 304 and 312.

Note that, if a video client's BRB is adjusted based on MinVQ or MaxVQ in step 304, then that video client's BRB is independent of RSS and RVA (i.e., BRB is not set in step 312 based on that client's RSS and RVA).

Although the invention has been described in the context of a scheduling algorithm that takes into account the parameters MinVQ, MaxVQ, RSS, and RSA, those skilled in the art will understand that the invention can also be implemented in the context of other scheduling algorithms that take into account fewer than these four parameters and/or one or more additional parameters, all of which are transmitted to the RAN node as in-band information.

Although the invention has been described in the context of TCP packetized video streams, the invention can also be implemented in the context of communications systems that conform to other transmission protocols.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "node" or "server" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Signals and corresponding terminals, nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A video server for a mobile communications system comprising:
   a plurality of radio access network (RAN) nodes, each RAN node configured to communicate wirelessly with a plurality of wireless user devices;
   a video server configured to transmit one or more packetized video streams to one or more of the wireless user devices; and
   a packet core configured to route packets of video data from the video server to the one or more wireless user devices via the RAN nodes, wherein:
      the video server is configured to determine corresponding information related to each of the one or more packetized video streams; and
      the video server is configured to transmit, in each packetized video stream, the corresponding determined information as in-band information; and
      the in-band information is usable by each RAN node to schedule transmission of the packets of video data to the one or more wireless user devices.

2. The video server of claim 1, wherein:
   the packets of video data are Transmission Control Protocol (TCP) packets; and
   the video server is configured to transmit the in-band information in TCP Options fields in the TCP packets.

3. The video server of claim 1, wherein the video server is configured to transmit the in-band information at the start of a video chuck of each packetized video stream.

4. The video server of claim 1, wherein, when a wireless user device receiving a packetized video stream moves from a first RAN node to a second RAN node, such that subsequent packets of video data for the packetized video stream get routed to the wireless user device via the second RAN node instead of the first RAN node:
   the video server includes the in-band information in one or more of the subsequent packets of video data; and
   the in-band information is used by the second RAN node to schedule transmission of the subsequent packets of video data to the wireless user device.

5. The video server of claim 1, wherein, for each packetized video stream, the in-band information comprises:
   a minimum video quality (VQ) level value;
   a maximum VQ level value;
   a relative screen size value; and
   a relative video activity value.

6. The video server of claim 5, wherein, for each packetized video stream:
   the video server is configured to determine the minimum and maximum VQ level values from a video manifest received from a corresponding wireless user device;
   the video server is configured to determine the relative screen size value from a user agent field in an HTTP request received by the video server from the corresponding wireless user device; and
   the video server is configured to determine the relative video activity value by analyzing content of the packetized video stream.

7. The video server of claim 6, wherein the video server is configured to (i) determine the relative video activity value by analyzing the content of the packetized video stream off line and (ii) store the relative video activity value for subsequent transmission with the packetized video stream.

8. The video server of claim 7, wherein:
   the packets of video data are TCP packets;
   the video server is configured to transmit the in-band information in TCP Options fields in the TCP packets;
   the video server is configured to transmit the in-band information at the start of a video chuck of each packetized video stream;
   when a wireless user device receiving a packetized video stream moves from a first RAN node to a second RAN node, such that subsequent packets of video data for the packetized video stream get routed to the wireless user device via the second RAN node instead of the first RAN node:
      the video server includes the in-band information in one or more of the subsequent packets of video data; and
      the in-band information is usable by the second RAN node to schedule transmission of the subsequent packets of video data to the wireless user device.

9. A method for a video server that transmits one or more packetized video streams to one or more wireless user devices in a mobile communications system further comprising (i) a plurality of radio access network (RAN) nodes, each RAN node configured to communicate wirelessly with a plurality of wireless user devices and (ii) a packet core configured to route packets of video data from the video server to the one or more wireless user devices via the RAN nodes, the method comprising:
   (a) the video server determining information related to each packetized video stream, wherein each packetized video stream is transmitted by the video server toward a wireless user device via the packet core and a corresponding RAN node; and
   (b) the video server transmitting the information as in-band information in the packetized video stream, wherein the in-band information is usable by the corresponding RAN node to schedule transmission of the packets of video data to the wireless user device.

10. The method of claim 9, wherein, for each packetized video stream, the in-band information comprises:
    a minimum video quality (VQ) level value;
    a maximum VQ level value;
    a relative screen size value; and
    a relative video activity value.

11. The method of claim 10, wherein, for each packetized video stream:
    the video server determines the minimum and maximum VQ level values from a video manifest received from a corresponding wireless user device;
    the video server determines the relative screen size value from a user agent field in an HTTP request received by the video server from the corresponding wireless user device; and
    the video server determines the relative video activity value by analyzing content of the packetized video stream.

12. The method of claim 11, wherein the video server (i) determines the relative video activity value by analyzing the content of the packetized video stream off line and (ii) stores the relative video activity value for subsequent transmission with the packetized video stream.

13. The method of claim 9, wherein:
    the packets of video data are TCP packets; and
    the video server transmits the in-band information in TCP Options fields in the TCP packets.

14. The method of claim 9, wherein the video server transmits the in-band information at the start of a video chuck of each packetized video stream.

15. A method for a RAN node that communicates wirelessly with a plurality of wireless user devices in a mobile communications system further comprising (i) one or more other RAN nodes, (ii) a video server configured to transmit one or more packetized video streams to one or more of the wireless user devices and (iii) a packet core configured to route packets of video data from the video server to the one or more wireless user devices via the RAN nodes, the method comprising:

(a) the RAN node receiving packets of video data for each packetized video stream being transmitted by the video server to a wireless user device via the packet core and the RAN node, wherein each packetized video stream includes in-band information related to the packetized video stream;

(b) the RAN node extracting the in-band information;

(c) the RAN node using the extracted in-band information to schedule transmission of the packets of video data to the one or more corresponding wireless user devices; and (d) the RAN node transmitting the packets of video data to the one or more corresponding wireless user devices.

16. The method of claim 15, wherein, for each packetized video stream, the in-band information comprises:
a minimum video quality (VQ) level value;
a maximum VQ level value;
a relative screen size value; and
a relative video activity value.

17. The method of claim 15, wherein:
the packets of video data are TCP packets; and
the in-band information is transmitted in TCP Options fields in the TCP packets.

18. The method of claim 15, wherein, when a wireless user device receiving a packetized video stream moves from a different RAN node to the RAN node, such that subsequent packets of video data for the packetized video stream get routed to the wireless user device via the RAN node instead of the other RAN node:
the in-band information is included by the video server in one or more of the subsequent packets of video data; and
the RAN node uses the in-band information to schedule transmission of the subsequent packets of video data to the wireless user device.

\* \* \* \* \*